United States Patent
Hawwa et al.

(10) Patent No.: US 11,495,858 B2
(45) Date of Patent: Nov. 8, 2022

(54) PHOTOVOLTAIC CELL WITH RESPONSIVE SURFACE FILM

(71) Applicants: KING FAHD UNIVERSITY OF PETROLEUM AND MINERALS, Dhahran (SA); MASSACHUSETTS INSTITUTE OF TECHNOLOGY, Cambridge, MA (US)

(72) Inventors: Muhammad A. Hawwa, Dhahran (SA); Hussain M. Al-Qahtani, Dhahran (SA); M. Wasim Raad, Dhahran (SA); David E. Hardt, Cambridge, MA (US)

(73) Assignees: KING FAHD UNIVERSITY OF PETROLEUM AND MINERALS, Dhahran (SA); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 419 days.

(21) Appl. No.: 16/798,782

(22) Filed: Feb. 24, 2020

(65) Prior Publication Data
US 2020/0259141 A1 Aug. 13, 2020

Related U.S. Application Data

(63) Continuation of application No. 16/271,896, filed on Feb. 11, 2019, now abandoned.

(51) Int. Cl.
*G06K 7/10* (2006.01)
*H02S 50/00* (2014.01)
*H01M 50/20* (2021.01)

(52) U.S. Cl.
CPC ........ *H01M 50/20* (2021.01); *G06K 7/10366* (2013.01); *H02S 50/00* (2013.01); *H01M 2220/20* (2013.01)

(58) Field of Classification Search
CPC .............. G06K 7/10366; H02S 50/00
(Continued)

(56) References Cited

U.S. PATENT DOCUMENTS 9,574,966 B2 2/2017 Huang et al.
2010/0231407 A1 9/2010 Carr
(Continued)

FOREIGN PATENT DOCUMENTS

CN 105610397 A 5/2016
KR 10/2018/0001827 A 1/2018

OTHER PUBLICATIONS

Niclas, "RFID chip in solar modules: efficient tagging and performance tracking?", http://sinovoltaics.com/solar-system-monitoring/rfid-chip-in-solar-modules-efficient-tagging-and-performance-tracking/, Apr. 4, 2016, 16 pages.

*Primary Examiner* — Toan C Ly
(74) *Attorney, Agent, or Firm* — Oblon, McClelland, Maier & Neustadt, L.L.P.

(57) ABSTRACT

A photovoltaic (PV) cell health monitoring apparatus includes a Radio Frequency Identification (RFID) tag mounted to the PV cell and having identifying information of the PV cell, and a sensor in communication with the RFID tag for measuring health information of the PV cell. The RFID tag stores the measured health information together with time and locality information of the PV cell and responds to an interrogation signal by transmitting the stored information together with the identifying information. A dust sensor in the form of a comb-like electrode array measures electrical capacitance as an indication of an amount of dust on an exposed surface of the PV cell. An RFID tag antenna arranged as a meander-line patch antenna covered with polyethylene has a dual function as a temperature sensor.

13 Claims, 18 Drawing Sheets

(58) Field of Classification Search
USPC .......................................................... 235/451
See application file for complete search history.

(56) References Cited

U.S. PATENT DOCUMENTS

| | | | |
|---|---|---|---|
| 2010/0274447 A1* | 10/2010 | Stumpf | G01D 15/00 |
| | | | 73/146 |
| 2011/0156883 A1 | 6/2011 | Balbo Di Vinadio et al. | |
| 2011/0220182 A1 | 9/2011 | Lin et al. | |
| 2013/0180271 A1 | 7/2013 | Kuczynski | |
| 2018/0287388 A1 | 10/2018 | Bates | |

* cited by examiner

| 2201 | 2203 | 2205 | 2207 |
|---|---|---|---|
| ReadingID | Tag ID | Temperature | Read Date |
| 1 | 0080b0403c000000120ab599 | 24 | 2016-05-08 05:00:15 |
| ReadingID | Tag ID | Temperature | Read Date |
| 2 | 0080b0403c000000120ab599 | 24 | 2016-05-08 05:05:15 |
| ReadingID | Tag ID | Temperature | Read Date |
| 3 | 0080b0403c000000120ab599 | 24 | 2016-05-08 05:10:15 |
| ReadingID | Tag ID | Temperature | Read Date |
| 4 | 0080b0403c000000120ab599 | 24 | 2016-05-08 05:15:15 |
| ReadingID | Tag ID | Temperature | Read Date |
| 5 | 0080b0403c000000120ab599 | 24 | 2016-05-08 05:20:15 |
| ReadingID | Tag ID | Temperature | Read Date |
| 6 | 0080b0403c000000120ab599 | 24.25 | 2016-05-08 05:25:15 |
| ReadingID | Tag ID | Temperature | Read Date |
| 7 | 0080b0403c000000120ab599 | 24.25 | 2016-05-08 05:30:15 |
| ReadingID | Tag ID | Temperature | Read Date |
| 8 | 0080b0403c000000120ab599 | 24.5 | 2016-05-08 05:35:15 |
| ReadingID | Tag ID | Temperature | Read Date |
| 9 | 0080b0403c000000120ab599 | 24.5 | 2016-05-08 05:40:15 |
| ReadingID | Tag ID | Temperature | Read Date |
| 10 | 0080b0403c000000120ab599 | 24.5 | 2016-05-08 05:45:15 |
| ReadingID | Tag ID | Temperature | Read Date |
| 11 | 0080b0403c000000120ab599 | 24.75 | 2016-05-08 05:50:15 |
| ReadingID | Tag ID | Temperature | Read Date |
| 12 | 0080b0403c000000120ab599 | 24.75 | 2016-05-08 05:55:15 |
| ReadingID | Tag ID | Temperature | Read Date |
| 13 | 0080b0403c000000120ab599 | 25 | 2016-05-08 06:00:15 |

FIG. 22

PHOTOVOLTAIC CELL WITH RESPONSIVE SURFACE FILM

CROSS-REFERENCE TO RELATED APPLICATIONS

The present application is a Continuation of Ser. No. 16/217,896, pending, having a filing date of Dec. 12, 2018.

BACKGROUND OF THE INVENTION

Field of the Invention

The present disclosure relates generally to a dust sensor for photovoltaic (PV) cells, in particular a sensor-based radio-frequency identification (RFID) tag having a passive RFID tag that can retain and transmit information wirelessly in conjunction with the dust sensor. Together with other sensors, health conditions of the PV cell can be detected in addition to the level of dust; the detected health information can be stored in and transmitted by the RFID tag.

Description of the Related Art

In moving toward greater use of clean energy sources, large fields of hundreds of PV panels (made up of solar modules), often referred to as solar farms, are being installed. A PV module may consist of a plane of an integrated group of multiple PV cell devices. Solar farms need to last about a decade in order to justify return on investment. On a lesser scale, it is becoming more common for arrays of tens or a few hundred PV panels or modules to be installed on or near homes and buildings. Because the PV modules are mounted in open fields, they are subject to various weather and environmental conditions that can affect their efficiency, and may even suffer various faults. Over time, PV modules exposed to the environment accumulate dust and organic matter. Dust and organic matter accumulation can lead to reduced power output. Other conditions such as temperature, humidity, and cloudiness may have an impact on efficiency. Faults and other malfunctions may be detected as hot spots in PV cells.

An emerging technology for radio-frequency identification (RFID) is passive RFID tags. Ultra-high frequency (UHF) radio-frequency identification (RFID) tags have become more reliable as integrated circuit techniques have evolved. Passive RFID tags offer features including battery-less operation, wireless communication, high flexibility & low cost. RFID is typically used in supply chain & warehousing. Radio frequency identification (RFID) technology in the ultra-high frequency (UHF) band is currently being used for identification and tracking of various products.

Recently researchers have been exploring the possibility of obtaining physical attributes of objects in the environment from low level processing of electromagnetic signals backscattered from RFID tags. UHF RFID technology has substantial growth potential in the area of computing and sensing applications. This potential could be implemented by integrating various sensors, such as temperature, humidity and acceleration sensors, to passive RFID tags (Juha Virtanen, Leena Ukkonen, Toni Björninen and Lauri Sydänheimo, "Temperature Sensor Tag for Passive UHF RFID Systems", in IEEE sensors application Symposium, Feb. 22-24, 2011, San Antonio, Tex., USA—incorporated herein by reference).

Temperature sensing may be used to indicate that a PV cell has one or more hot spots. Hot spots may indicate internal failures such as shorts in electrical conductors of the PV cells or may be caused by cracks in the PV cells. Temperature sensing in the previous applications of RFID has led to many realizations of passive UHF RFID temperature sensors by various researchers. These past realizations can be grouped into two sub-categories. The first category consists of passive temperature sensors integrated into an RFID integrated circuit (IC) (P. Sunghyun, M. Changwook, C. Seong-Hwan, "A 95 nW ring oscillator-based temperature sensor for RFID tags in 0.13 μm CMOS," IEEE International Symposium on Circuits and Systems, 2009. ISCAS 200, pp. 1153-1156, 24-27 May 2009; M. K Law, A. Bermak, H. C. Luong, "A Sub-μW Embedded CMOS Temperature Sensor for RFID Food Monitoring Application," IEEE Journal of Solid-State Circuits, vol. 45, no. 6, pp. 1246-11255, June 2010—incorporated herein by reference). This approach removes the need for any external sensor component, eases the assembly of a sensor tag and provides savings in the manufacturing costs if mass-produced. Most importantly, these integrated sensors are able to output their data digitally, thus maximizing the accuracy of the sensing. However, the commercialization of such RFID ICs has not begun and most IC designs are still in the prototyping stage. The second category is formed by passive UHF RFID temperature sensor tags, which are equipped with an external sensor element. In this approach, researchers have integrated external sensor elements such as mechanical structures (R. Bhattacharyya, C. Floerkemeier, S. Sarma, "RFID tag antenna based temperature sensing," 2010 IEEE International Conference on RFID, pp. 8-15, 14-16 Apr. 2010—incorporated herein by reference) or shape-memory alloys. These kinds of sensor tags are able to utilize commercial RFID ICs and because they have no additional temperature sensing electronics they usually possess long read ranges. The drawback is the high cost of sensing materials and the complexity of the tag structure. The interpretation of information from such external sensors is slightly more complicated than the use of fully integrated sensor devices. The sensor readout has to be made indirectly by monitoring changes in the tag's backscattered power, electronic product code (EPC) or threshold power i.e. the transmit power needed to activate the tag.

Regarding dust and organic matter, several sensors for detecting dust have been developed. Sensors for detecting dust may be classified as two types of sensing technologies. One technology is based on optical principles, where a light is illuminated onto the surface and the reflected light intensity is measured as an indicator for particle accumulation on the surface. A second technology is based on measuring a vibrator's frequency to decide if dust particles are sticking on the vibrator mounted on the surface.

Examples of these two types of sensing technologies may be found in patent literature. With regard to dust detection based on optical principals, U.S. Pat. No. 8,804,119—incorporated herein by reference—relates to a particle detection system that uses at least one light source adapted to illuminate a volume being monitored at at least two wavelengths. U.S. Pat. No. 8,638,391—incorporated herein by reference—relates to an image sensor assembly capable of effectively removing dust sticking onto a surface of an image sensor. U.S. Pat. No. 8,514,090—incorporated herein by reference—relates to a dust level sensor arrangement for dust collection system. The sensor has an adjustment to control the distance at which it picks up light off the collected material. U.S. Pat. No. 8,451,460—incorporated herein by reference—relates to a monitoring system for the acquisition of the layer thickness of dust in ventilation ducts.

The monitoring system includes a light source and a sensor. The light source is arranged to transmit light across a detection surface and the sensor is on the other side of the detection surface. When a substance, such as dirt or grease, is deposited on the surface it obstructs the light and the amount of light reaching the sensor decreases. U.S. Pat. No. 8,342,710—incorporated herein by reference—relates to a loupe lens and lighting assembly for enhancing detection of dust particles on the optical sensor of a digital camera. U.S. Pat. No. 7,702,236 relates to a digital image acquisition device with built in dust and sensor mapping capability. The device derives a map of defects on the surface of the sensor from a calibration image acquired by the sensor when illuminated by a light source. U.S. Pat. No. 7,292,338 incorporated herein by reference—relates to a particle detection apparatus and particle detection method. T particle detection apparatus has a light source and a detection device for detecting light from the light source, and detects particles floating in the air at a position through which the light passes. U.S. Pat. No. 5,412,221—incorporated herein by reference—relates to a particle fallout/activity sensor. The particle fallout/activity sensor measures relative amounts of dust or other particles which collect on a mirror in an area to be monitored. The sensor includes a sensor module and a data acquisition module, both of which can be operated independently of one another or in combination with one another. The sensor module includes a housing containing the mirror, an LED assembly for illuminating the mirror and an optical detector assembly for detecting light scattered off of the mirror by dust or other particles collected thereon.

With regard to dust detection based on measuring a vibrator's frequency, U.S. Pat. No. 5,910,700—incorporated herein by reference—relates to a dust sensing apparatus that uses a transducer element oscillating at a resonant frequency to detect changes in dust concentration. U.S. Pat. No. 5,698,931—incorporated herein by reference—relates to a sensor element for detecting solid particles in a fluid. At least one of the detecting unit and the vibrating portion contacts with a solid particle in the fluid so that the piezoelectric film converts the vibration into an electric signal.

Accordingly it is one object of the disclosure to provide a dust sensor that does not sense other effects or lack of polishing when sensing dust and that does not cause wear on the object being sensed. It is a further object of the disclosure to perform health monitoring of PV cells using a dust sensor, and sensors for other conditions that can influence performance, such as temperature, humidity, and wind.

SUMMARY OF THE INVENTION

According to an embodiment of the present disclosure, there is provided a photovoltaic (PV) cell health monitoring apparatus. The apparatus includes a Radio Frequency Identification (RFID) tag mounted to the PV cell and having identifying information of the PV cell, and a sensor in communication with the RFID tag for measuring health information of the PV cell. The RFID tag stores the measured health information together with time and locality information of the PV cell and responds to an interrogation signal by transmitting the stored information together with the identifying information.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 22 shows an example display of data including measurements of hot spots.

DETAILED DESCRIPTION OF THE PREFERRED EMBODIMENTS

Figure 1:
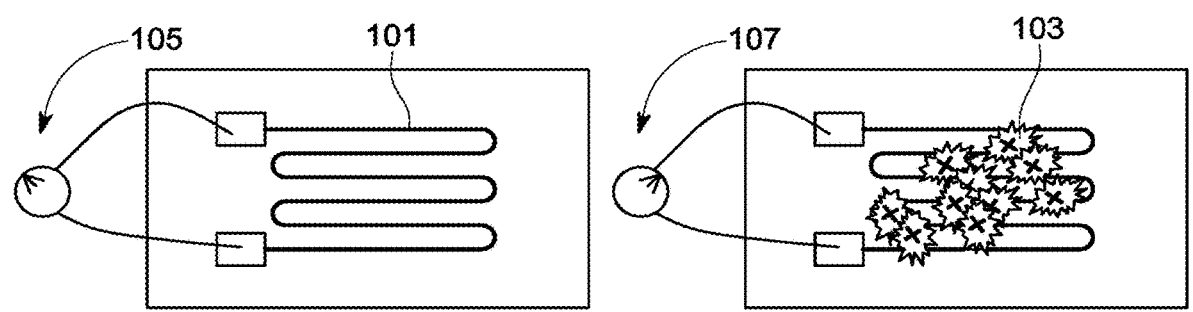
FIG. 1 is a schematic for an arrangement for measuring electrical conductivity in accordance with an exemplary aspect of the disclosure.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

Furthermore, the terms "approximately," "proximate," "minor," and similar terms generally refer to ranges that include the identified value within a margin of 20%, 10% or preferably 5% in certain embodiments, and any values therebetween.

Referring now to the drawings, wherein like reference numerals designate identical or corresponding parts throughout the several views.

There is a need to regularly check the influential parameters that affect the performance of PV cells in order to prevent degradation of performance. Dust and organic matter collect on the PV cells and can reduce the system's total output. Diagnosis of PV cell problems by how much energy is produced is not decisive. A number of reasons besides dust accumulation can cause low or no power output including wiring problems, inverter malfunctioning, corrosion, and can cause lack of efficiency. Therefore, there is a need to have a sensor that focuses on dust accumulation.

In one embodiment, a dust sensor is arranged as a thin film comb electrode array. Operation of a comb electrode array was demonstrated by measuring electrical characteristics of a conductive ink printed on a polymeric thin film. The operation of the dust sensor is based on the fact that most dust particles carry positive static electric charge and adhere to surfaces by electrostatic forces. Most of the naturally blown dust is made of charged particles. Thus, the dust sensor operates based on a principal that charged particles will stick or adhere to a printed conductive element. In particular, electrical conductivity measurements are an indicator of the severity of dusty accumulation. FIG. 1 is a schematic for an arrangement for measuring electrical conductivity of printed leads 101 on a thin film polymer. The schematic illustrates how electrical conductivity measurements 105 and 107 would differ before and after accumulation of charged dust particles 103.

The disclosed electrical conductivity based dust sensor eliminates disadvantages of the previously described optical reflectivity based and vibration-based dust sensors. Previous optical reflectivity based sensors may mix dust with other effects such as fog or lack of polishing. Previous vibration-based sensors require high frequency oscillations that may cause wear and particle shedding.

Figure 2:
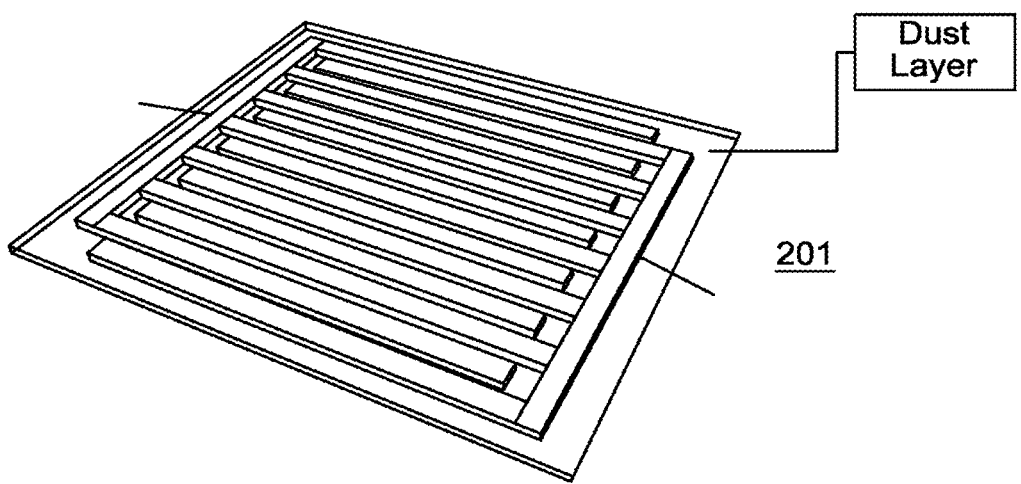
FIG. 2 is a schematic diagram of an example of fine comb of electrodes in accordance with an exemplary aspect of the disclosure.

The disclosed dust sensor measures the electrical impedance change as dust particles fall upon a fine (<50 μm spacing between adjacent electrodes) comb of electrodes patterned on an exposed surface of the PV cell. In one embodiment, the fine comb of electrodes may be a thin film of patterned conductors, in which spacing between adjacent electrodes is between approximately 5 and 50 microns. FIG. 2 is a schematic diagram illustrating the embodiment of a fine comb of electrodes. The fine comb of electrodes 200 includes an array of anode electrodes 201 connected to a common feeding electrode and an opposing array of cathode electrodes 203 that are interleaved with the anode electrodes and are connected to a common source electrode. The anode array of electrodes and the opposing cathode array of electrodes are disposed in a single thin film layer. The thin film layer of electrodes is formed on a transparent substrate. In one embodiment, one array of electrodes may be disposed at a different layer from a lower layer of another electrode array.

The fine comb of electrodes 200 may be printed on a substrate 205. The substrate 205 may be made of a thin plastic film or glass. Each electrode may be the same uniform width, length and thickness. The length and width of each of the electrodes may be set based on the dimensions of the area of the substrate 205 that is to be monitored for dust accumulation. The width of each electrode may be set proportional to the overall width of the area to be monitored with the constraint that the spacing between adjacent electrodes be less than approximately 50 μm. It is preferable that the width of each electrode be uniform and substantially the same for each electrode. It is not necessary that an area of the substrate to be measured be covered by a single fine comb of electrodes 200. More than one fine comb of electrodes 200 may be used to cover an area designated for dust measurement. Also the array of anode electrodes 201 may be identical in shape, overall dimension, and number of electrodes as the array of cathode electrodes 203.

In one embodiment, for a substrate that is approximately 150 mm by 150 mm square, each electrode in the comb electrode has an approximately 50 micron width and has an approximately 140 mm length. A spacing between adjacent electrodes is approximately 50 microns. The thickness of the layer of printed electrodes is approximately 2 to 5 microns. The electrodes are of a conductive material, preferably a transparent conductive film, including indium tin oxide, or other transparent conductive oxide such as fluorine doped tin oxide or doped zinc oxide. Electrodes may also be made of organic films using carbon nanotubes or a conductive polymer film. In some embodiments where transparency is not needed, the electrodes may be made of conductive metal such as copper.

Figure 3:
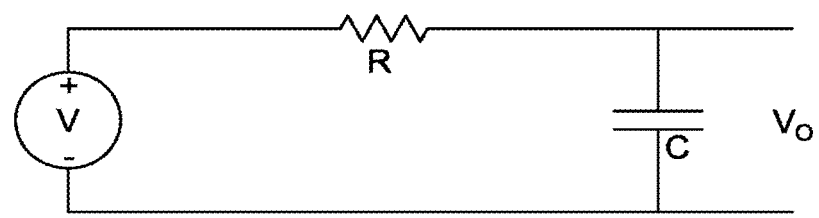
FIG. 3 is a circuit diagram for dust sensing in accordance with an exemplary aspect of the disclosure.

FIG. 3 is a circuit diagram for dust sensing using the fine comb of electrodes of FIG. 2. One end of resistance/capacitance (RC) circuit of FIG. 3 is connected to the common anode electrode of a comb array and the other end of RC circuit is connected to the cathode electrode of the opposing comb array. A change in the engaged comb capacitance causes a change the RC resonance frequency. Thus, relative change in RC circuit resonance frequency is proportional to the amount of dust accumulated on the engaged comb structure. In particular, it has been determined that the existence of dust on the fine comb of electrodes will cause the electrical capacitance to increase. Thus, the RC circuit of FIG. 3 may be used to calculate the change of sine wave phase (phase shift from wither R or C) due to accumulation of dust. The relative change in the phase of the sine wave is proportional to the amount of dust.

Figure 4:
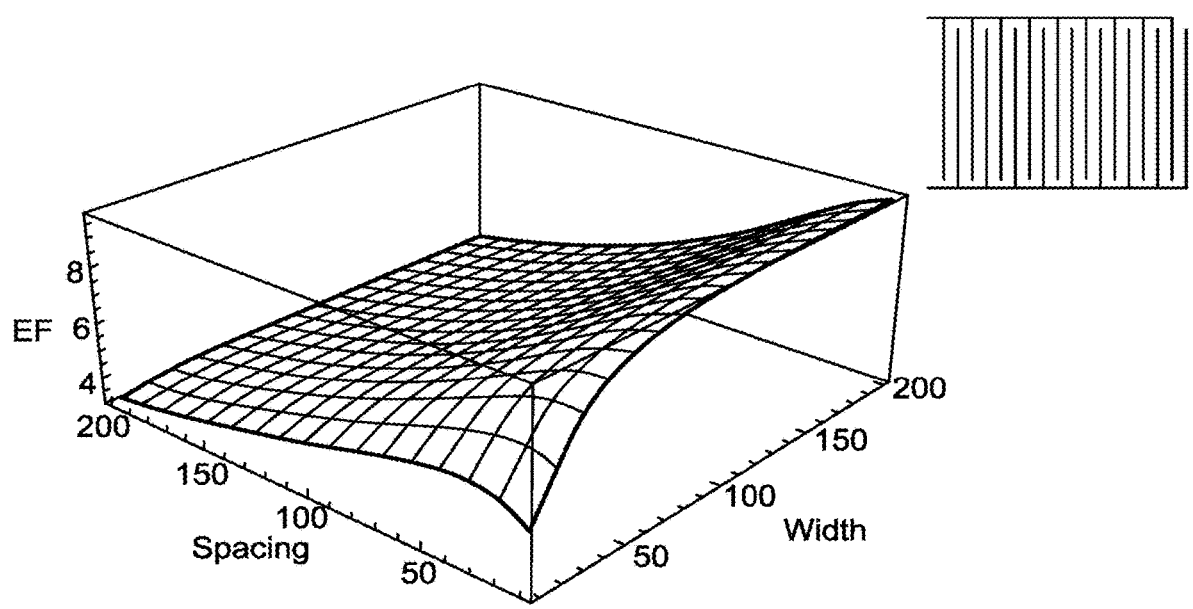
FIG. 4 is a chart for a relationship between electric field, spacing and width of the fine comb of electrodes in accordance with an exemplary aspect of the disclosure.

FIG. 4 is a graph for a relationship between electric field, spacing and width of the fine comb of electrodes. In FIG. 4, width refers to the width of an individual finger electrode and spacing refers to the distance between each two adjacent finger electrodes. As shown in the graph, the range of spacing between adjacent electrodes may be 50 to 200 microns. The range of width of electrodes may be 50 to 200 microns. According to the graph, an optimal electric field is obtained when spacing is small and width of electrodes is large. A calibration of the frequency change with the degree of dust coverage was performed using a high-frequency oscillator combined with a frequency counter.

Figure 5:
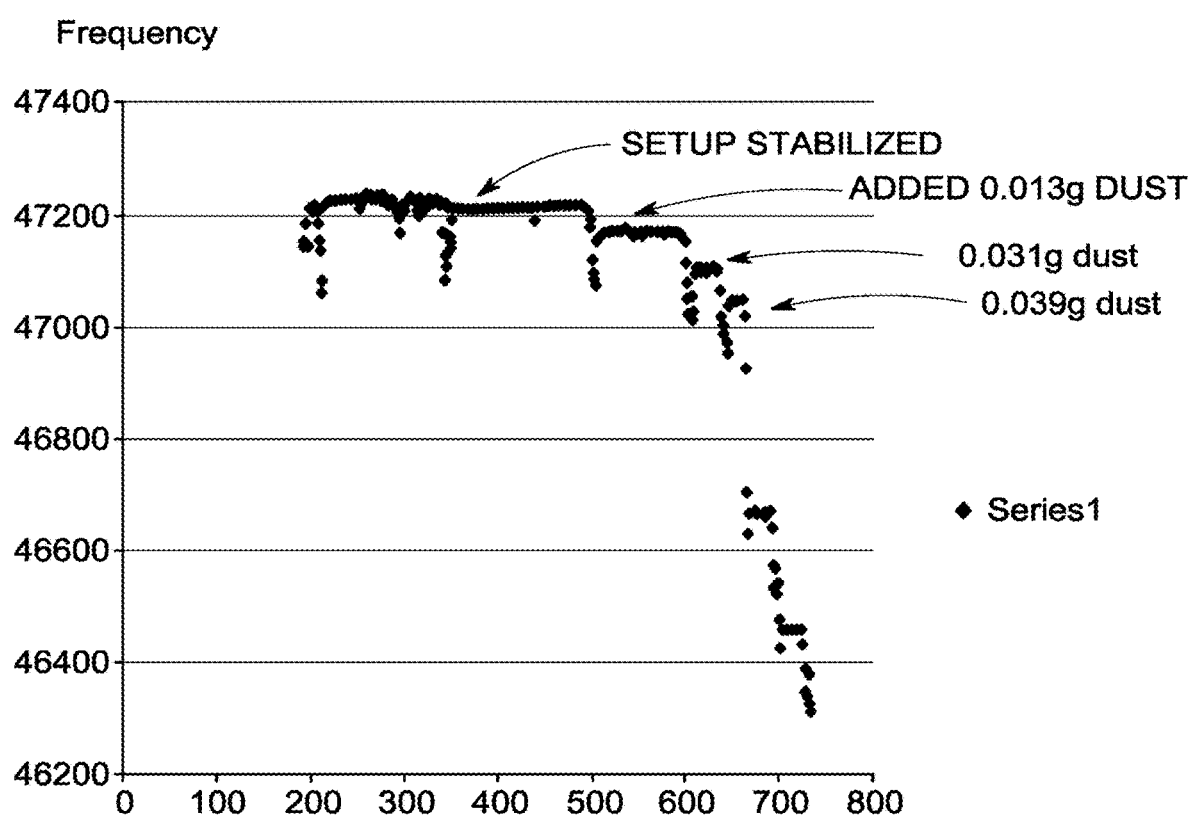
FIG. 5 is a plot of a relationship between frequency of the electrode array and dust coverage.

FIG. 5 is a graph of a relationship between frequency of the comb of electrodes and dust coverage. The comb of electrodes produces, as an output, capacitance changes and resonant frequency changes. The comb of electrodes used to generate this graph covered an approximately 150 mm by 150 mm square substrate. According to the graph, frequency begins to drop off after 0.039 grams of dust. The output produced by the comb of electrodes has accuracy sufficient to detect a small amount of dust so that the existence of dust may be reported and/or a dust repellence mechanism may be invoked to keep the PV cell efficiency high.

With the increasing use of PV systems, it is vital to study meteorological parameters that affect the performance of these systems. In disclosed embodiments, a large area comb electrode may be applied as thin film patterned conductors to detect the presence of dust on the surface of PV cells. It is preferred that the layers of comb electrodes be made of transparent conductive material. Types of transparent conductive material include indium tin oxide, fluorine doped tin oxide, doped zinc oxide. The individual electrodes in the comb may all be the same length and width. The length of individual electrodes may be approximately the length of a PV cell, which is typically about 150 mm, plus or minus a few millimeters.

RFID Tag Design

The output voltage of a PV module is normally rated by manufacturers under Standard Test Conditions (STC), where each module is tested under a temperature of 25° C.; solar radiation intensity of 1 kW/m^2 (one-sun of illumination), air mass of 1.5 spectrum (AM 1.5), and wind speed of 2 m/s. There is a need to make quick assessment of the environmental influence on the performance and efficiency of PV cells under a variety of environmental conditions.

As disclosed herein a radio-frequency identification (RFID) tag with an associated sensor(s) provides a significant advantage for PV cells "health monitoring." RFID tags having associated sensors allows for an arrangement for simultaneously interrogating all PV cells in "one shot". In particular, a RFID tag may be connected to each PV cell and may provide identification information for the PV cell. Identification information may include an ID number of the PV cell, manufacturer name, date of manufacture. The RFID tag may communicate with one or more sensors that measure influential parameters that affect health and efficiency of PV cells. These influential parameters may include (a) ambient temperature, (b) humidity, (c) rain/precipitation, (d) clouds (e) wind speed, and (f) dust accumulation.

The RFID tag is a component of a RFID system. The RFID system includes the RFID tag and a radio scanner called a reader or interrogator. The RFID tag includes an embedded antenna and an IC chip The RFID system may include a passive RFID tag, in which the energy required to drive the IC chip comes from the interrogation system (radio scanner) itself. A backscattering modulation is achieved when the IC chip acts as a switch, to match or mismatch its terminal impedance to the antenna. The impedance matching between tag antenna and IC chip is very important. In order to realize the maximum power transmission reflected from the RFID tag, the tag antenna has to conjugate match to the IC chip.

Figure 6:
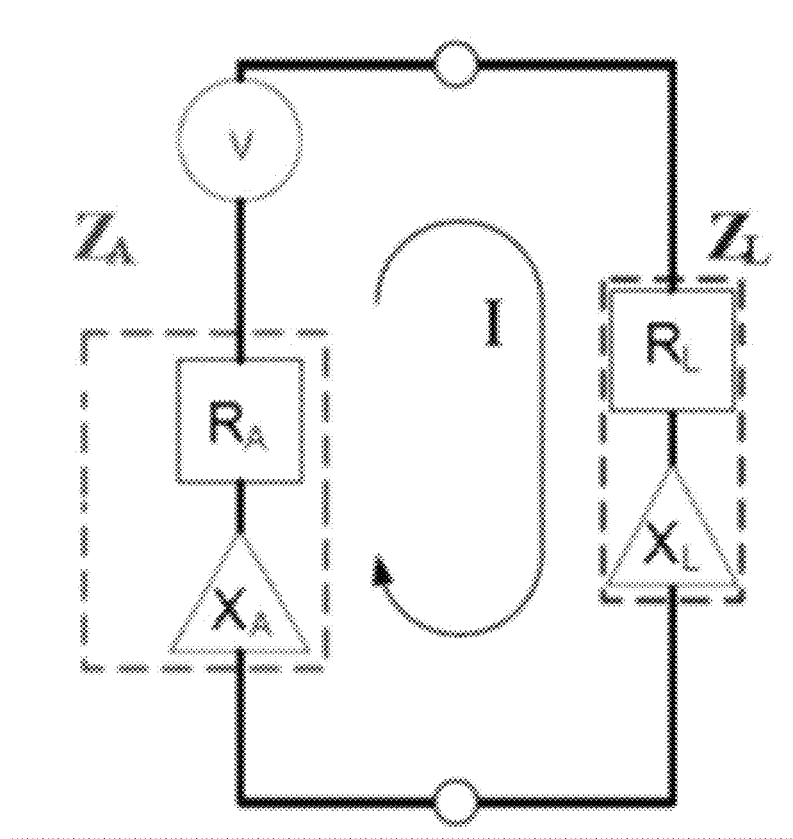
FIG. 6 illustrates an equivalent circuit of an RFID tag.

FIG. 6 illustrates an equivalent circuit of an RFID tag. The chip impedance $Z_L$ is given by $R_L+jX_L$ and the antenna impedance $Z_A$ is given by $R_A+jX_A$. When $Z_L=Z^*_A$, the maximum transmitted power Pt by a tag can be expressed as below:

$$P_t=0.5|I|^2 * R_A \quad (1)$$

Since $Z_L=Z^*_A$ $$I=V/(2R_A) \quad (2)$$

Substituting (2) for (1), gives $$P_t=0.5|V/(2R_A)|^2 \cdot R_A = V^2/(8R_A) \quad (3)$$

In order to produce large quantities of RFID tags at low cost, it is preferred that RFID tags be produced by printing methods.

Tag Antenna for Temperature Measurement

In RFID applications, the input impedance of the IC chip is no longer 50Ω or 75Ω due to the inclusion of an antenna. Generally, the resistance value of the IC chip is under 100Ω and its reactance is from −300Ω to −100Ω. That means the designed tag antenna impedance must is a complex value too. It is a challenge to design an antenna that will have complex input impedance within constraints of small size, low cost, and required range. In disclosed embodiments, the SMT EPC Gen2 IC (Texas Instruments) is used as the RFID chip. This RFID chip is approximately 1 mm by 1.45 mm, with a thickness of approximately 0.55 mm. For this RFID chip, an antenna with an operating frequency of 866.5 MHz may be set as the preferred antenna, with FR4 as the antenna substrate. The dielectric constant of the antenna substrate is 4.4. In order to conjugate match to the IC chip, the preferred impedance of the antenna is 9.8+j73Ω. It is preferred that the size dimension of the antenna be within 43 mm×43 mm. Other antenna arrangements for this RFID chip include a frequency of 915 MHz and impedance of 82+j61Ω, or a frequency of 953 MHz and impedance of 7.2+j53Ω. Of course other RFID chips may be used as long as they include a connection pin for an antenna and preferably is suitable for outdoor operating temperatures.

Figure 7:
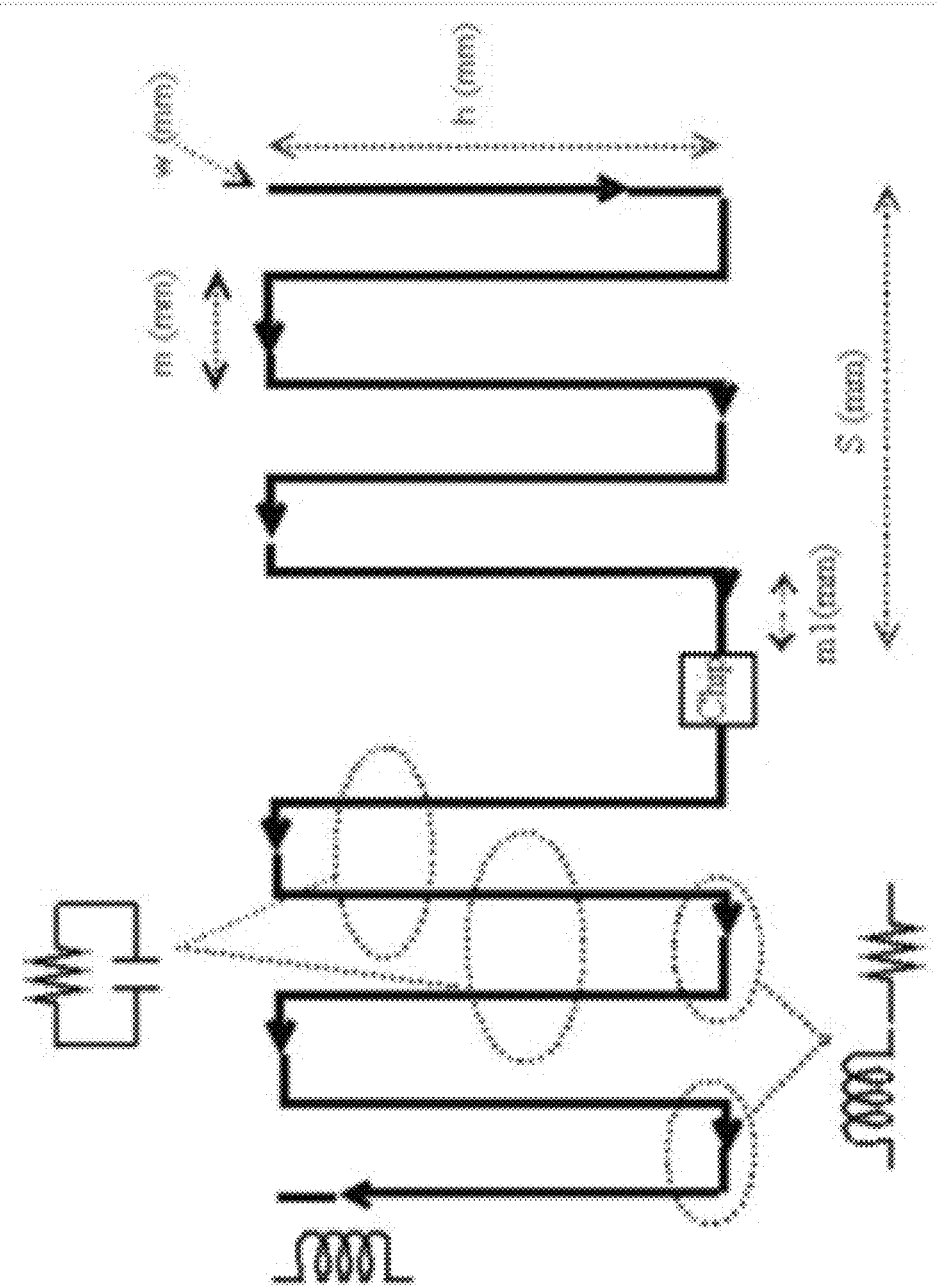
FIG. 7 is a line diagram illustrating the geometry of a meander-line antenna.

To meet the required small size dimension, a meander-line antenna may be used as it maximizes the length of the antenna line per unit space. FIG. 7 is a line diagram illustrating the geometry of a meander-line antenna connected to a RFID processor chip. The RFID chip and antenna constitute an RFID tag 700. Internal dimensions of the meander-line antenna include the distance ml from a processor chip 701 to the antenna 703, the antenna length S, and antenna height h, and the width w of each electrode.

Also, it is preferred that the antenna be configured to enhance the tag read range and be configured with a narrow bandwidth. Tag read range is the approximate distance from the RFID tag that the RFID reader will be able to send a signal and retrieve information stored in the RFID tag. A narrow band antenna is one in which the bandwidth is the smallest range of frequency that will pass a specific signal to carry data without distortion or loss of data. The narrower the bandwidth, the better the reading sensitivity. It is preferred that the antenna have a substrate material with dielectric permittivity of 4.5 and line width of approximately 1.5 mm to obtain a compact radiation structure that at the same time meets the demanding bandwidth specification. In some embodiments, the antenna is fed by a 50-Ω SMA connector (SMA stands for SubMiniature version A, which is a type of coaxial RF connector). For a tag read range of greater distance, a line width greater than 1.5 mm may be used, but in a larger antenna with dimensions greater than 43 mm by 43 mm.

Figure 8A:
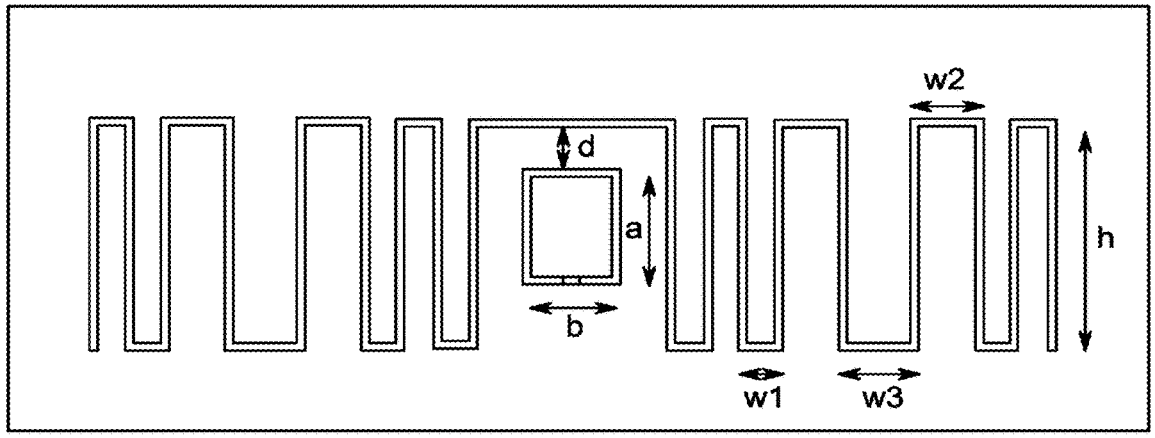
FIGS. 8A and 8B are diagrams of an antenna and the return loss of the antenna.
Figure 8B:
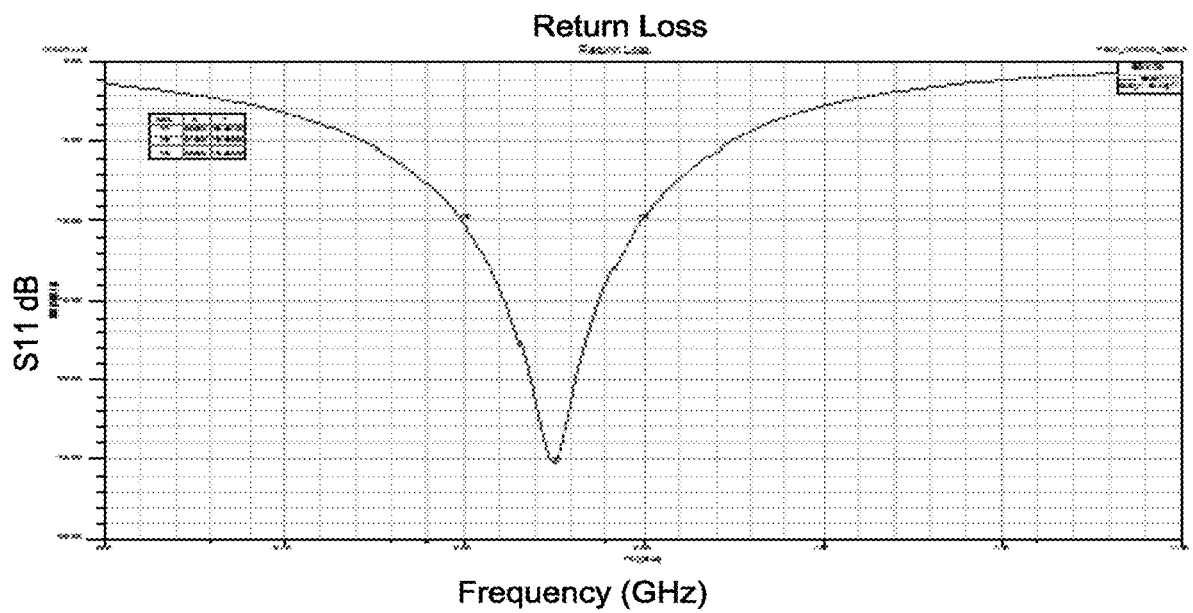

An embodiment of the antenna and the return loss are shown in FIGS. 8A and 8B. FIG. 8A is a schematic of a wiring pattern for a meander-line antenna having multiple unequal turns in accordance with an exemplary aspect of the disclosure. In particular, an antenna having unequal turns is one in which the distances between edges of adjacent sides of U-turns have various U-turn widths w1, w2, w3. A meander-line antenna having multiple unequal turns has been found to have higher efficiency compared to antenna with equal meander width. The antenna wiring pattern shown in FIG. 8A shows a uniform line width and an equal number of turns on each side of the IC chip, preferably eight turns on each side of the IC chip. Although U-turns may be curved, it is preferred that U-turns be arranged using straight sides in order to maximize antenna total length. The exemplary antenna wiring pattern miniaturizes the patch size and can resonate at 866 MHz. The total size of the antenna is 18 mm×42 mm and the antenna substrate is FR4 with a dielectric constant of 4.4. The antenna dimensions are shown in Table 1. The dimension h is the height of a side of a U-turn. Dimensions a and b are the dimensions of the IC chip. Dimensions w1, w2, w3 are widths of U-turns. Dimension d is a distance between the IC chip and a side of the antenna.
Table 1:
The Antenna Dimensions

| h | a | b | W1 | W2 | W3 | d | Width of the lines |
|---|---|---|----|----|----|---|---|
| 14 mm | 6 mm | 4.4 mm | 1.5 mm | 3 mm | 3.5 mm | 2.5 mm | 0.5 mm |

A simulation of this antenna wiring pattern was performed using ANSYS HFSS (High Frequency Structure Simulator). The simulation was performed at room temperature of 20 degrees C. One measurement of antenna performance is return loss. Return loss relates to an amount of extra energy returned to the antenna. A poor antenna design will have a large amount of reflected energy. It is typically preferred that the return loss be high, such as above 15 dB. FIG. 8B shows antenna return loss that was determined from the simulation.

Embedded Temperature Sensors

In disclosed embodiments, the RFID tag may be configured to communicate with one or more sensors to provide information of parameters of an individual PV cell. In one embodiment, an RFID tag is embedded with a temperature sensor to monitor the hot spots in a PV cell and send alerts remotely through the web in real-time. In other words, the embedded antenna of the RFID tag may be modified to provide a dual function as a temperature sensor.

Figure 9:
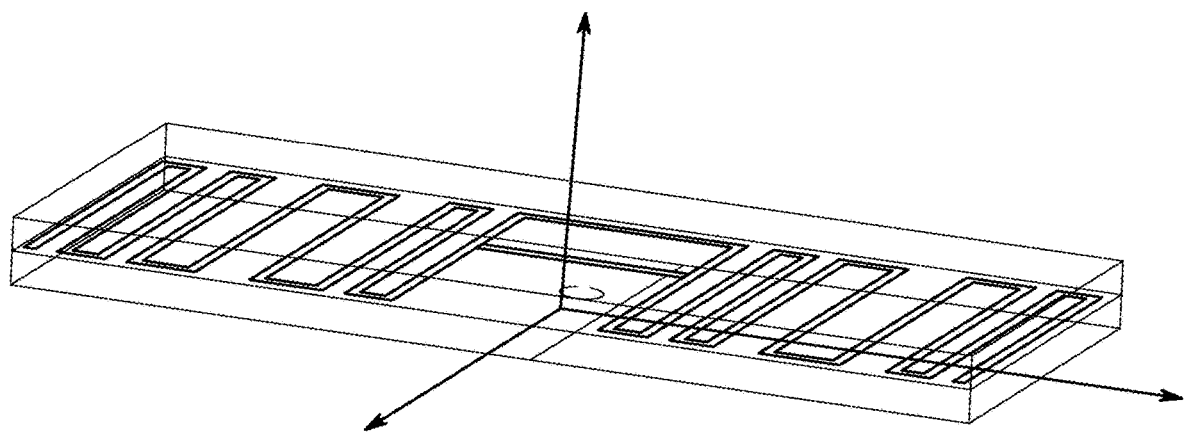
FIG. 9 is a perspective view of an antenna with an added temperature measurement layer.

Two types of temperature sensors for use in the RFID system have been considered. The two types of temperature sensors use two materials, respectively: distilled water and a thin film of polyethylene. In a first type of temperature sensor, distilled water acts as the temperature-sensing material, allowing temperature measurements from 0° C. up to nearly 100° C. In a second type of temperature sensor, a thin film of polyethylene allows temperature measurements up to approximately 125° C. According to simulations, it has been determined that the polyethylene film has more flexibility than distilled water (allowed temperature range). Additionally, the range of the bandwidth of the temperature sensor with polyethylene film is more than the temperature sensor with distilled water. In some embodiments, the temperature sensor adopted antenna may be made by printing. Printing the temperature sensor antenna may allow for developing low cost antenna based sensing. In both types of temperature sensors, a thin layer of distilled water or polyethylene film was added above an antenna, as shown in FIG. 9.

Figure 10:
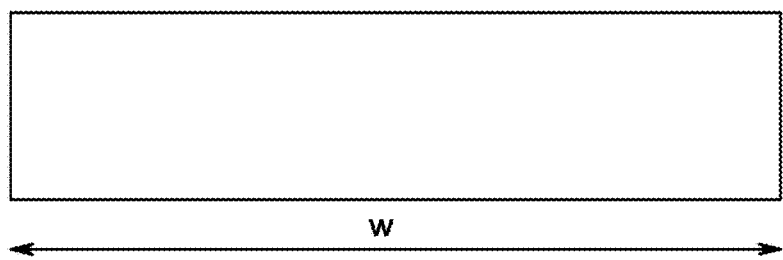
FIG. 10 is a diagram for explaining the w dimension of an antenna.

The antenna is preferably designed with parameter values that meet the required resonant frequency. The technique of setting value of some parameters for the resonant frequency may be done step by step. A first consideration is to design the dimensions of the antenna as shown in FIG. 10. The value of a parameter w is set. The parameter w is used to show the effect of this parameter on the resonant frequency of a UHF RFID tag antenna.

In a first step, Step 1: the width of the antenna is designed when the antenna is covered with distilled water. In this alternative, the width of the cover antenna was varied from 42 mm to 13 mm in increments of 2 mm. A simulation result of the return loss S11 for the various width dimensions of an antenna covered with distilled water is shown in FIG. 11.

Figure 11:
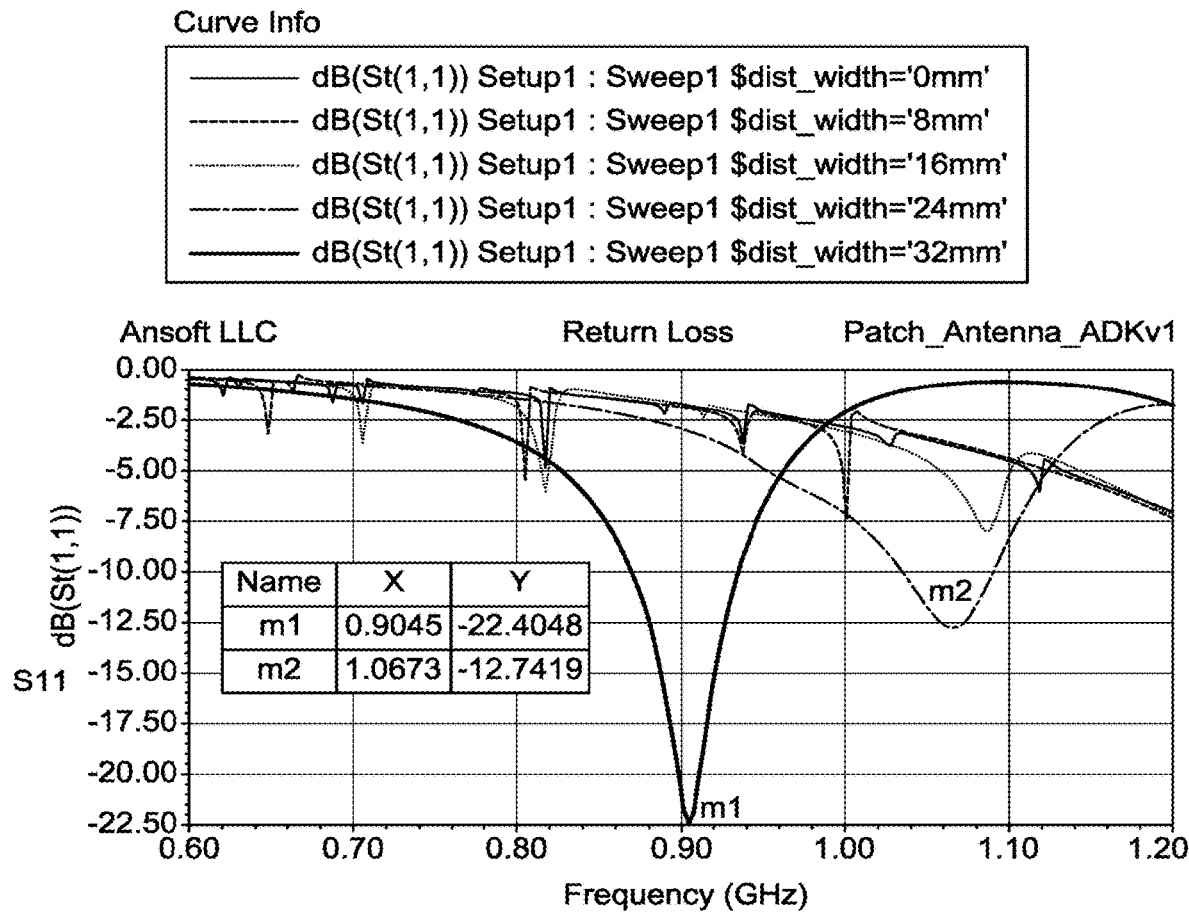
FIG. 11 is a graph of return loss S11 for the various width dimensions of an antenna covered with distilled water.
Figure 12:
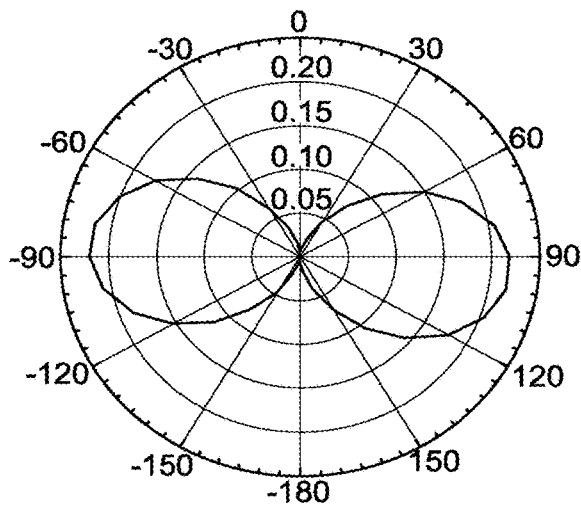
FIG. 12 is a plot of antenna gain for an antenna covered with distilled water.

FIG. 11 shows that the resonant frequency increases when the width of the covered tag antenna is increased. It is clear that when w is equal 13 mm, the resonant frequency will be compatible with the UHF RFID tag antenna characteristics, so it is chosen as the best value for width. The gain for the best value is shown in FIG. 12 at a resonant frequency 905 MHz and a bandwidth of 60 MHz. In the next step, the effect of the width parameter is determined when the antenna is covered with a thin film of polyethylene.

In Step 2: the width of the antenna is designed for an antenna covered with polyethylene film.

The same procedures as were done in Step 1 were performed with polyethylene film. The width of the cover for the antenna was varied from 42 mm to 13 mm in increments of 2 mm. A simulation result of the return loss for the various width dimensions of the tag antenna covered with polyethylene film is shown in FIG. 13.

Figure 13:
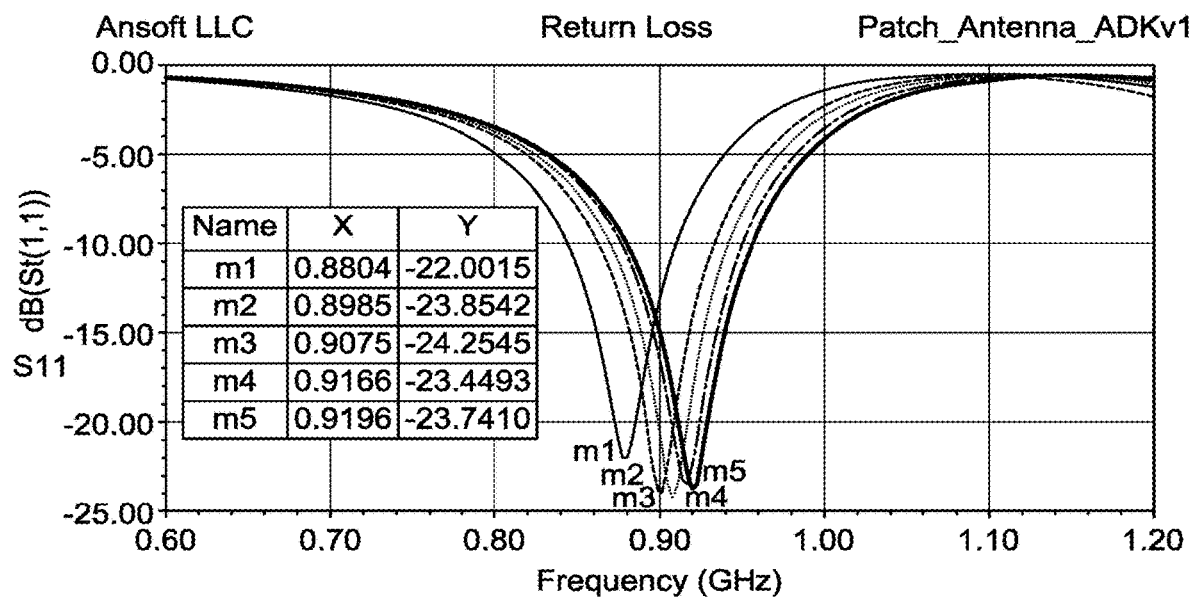
FIG. 13 is a graph of return loss for the various width dimensions of the tag antenna covered with polyethylene.
Figure 14:
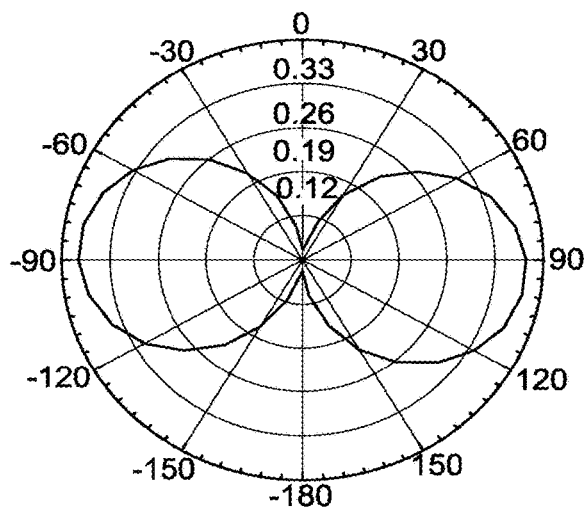
FIG. 14 is a plot of antenna gain for an antenna covered with polyethylene.

FIG. 13 shows that the resonant frequency increases when the width of the covered tag antenna is decreased. It is the inverse case compared with the distilled water. The resonant frequency is changed from 880-919 MHz. The best value occurred when the width is 42 mm because the resonant frequency is 880 MHz and the results is compatible with the UHF RFID tag antenna characteristics. The bandwidth of the best value is 70 MHz. The gain for the best value is shown in FIG. 14 at the resonant frequency 880 MHz.

The comparison results between the distilled water and the polyethylene film are shown in Table 2. For purposes of comparison, the thickness of the distilled water layer is approximately 2 mm and coverage along the antenna substrate is W=13 mm. For the case of high density polyethylene (HDPE), the thickness of the HDPE layer is approximately 1.5 mm and the coverage is 42 mm. In one embodiment, a meander-line antenna with a total size of 18 mm×42 mm and a thin film of polyethylene is used as the temperature sensor.

TABLE 2

| Sensitivity Comparison | | | |
|---|---|---|---|
| Material | Resonant Frequency | Bandwidth | Width |
| Distilled Water | 905 MHz | 60 MHz | 13 mm |
| Polyethylene | 880 MHz | 70 MHz | 42 mm |

System Architecture

Figure 15:
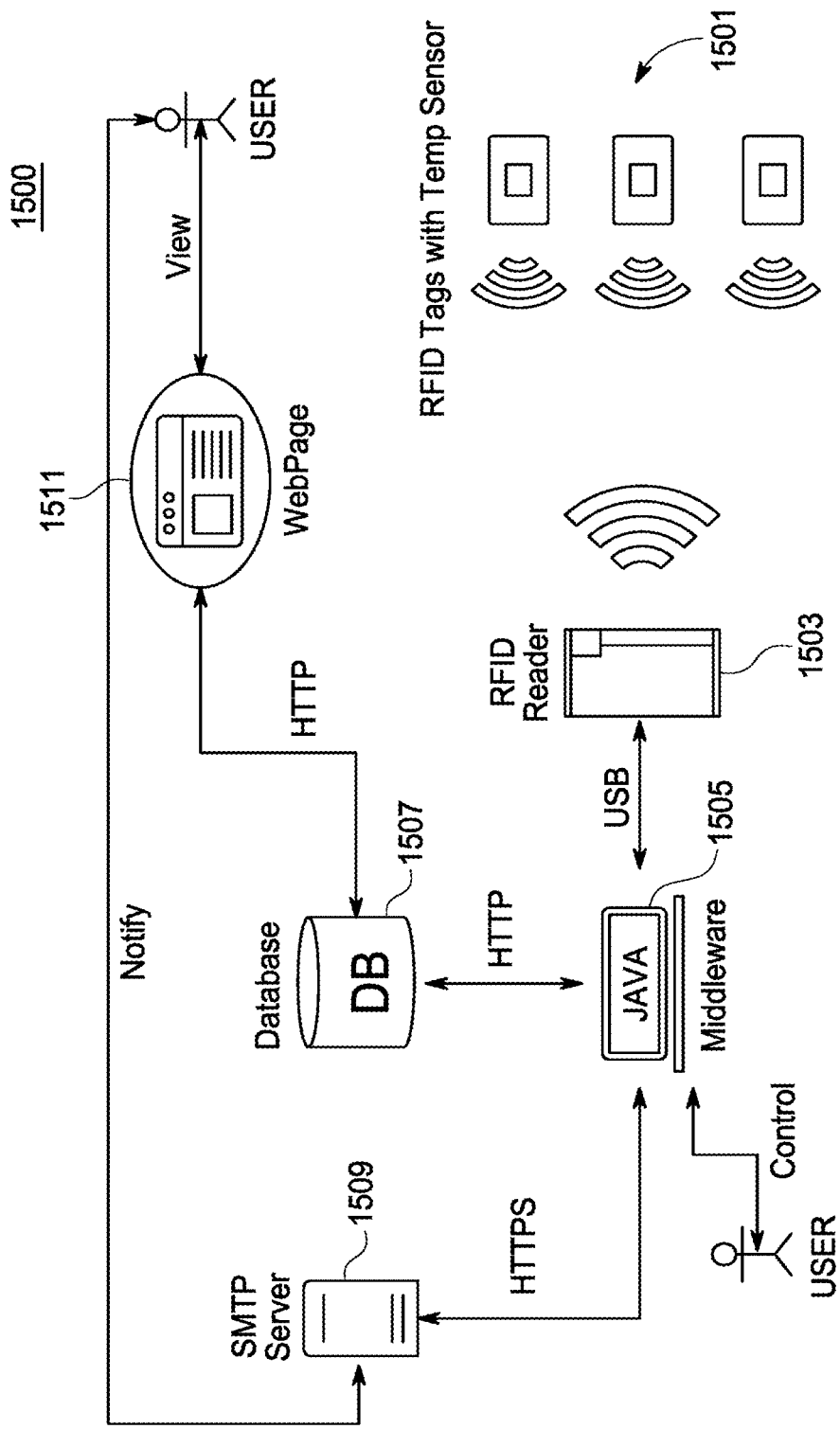
FIG. 15 is system diagram for an architecture of an RFID system having remote RFID tags and associated sensors in accordance with an exemplary aspect of the disclosure.

FIG. 15 is a system diagram for an architecture of an RFID system in accordance with an exemplary aspect of the disclosure. The RFID system includes an RFID reader for interrogating one or more RFID tags. The RFID tags in the present disclosure are remote RFID tags having associated sensors. A remote RFID tag may be connected to at least one sensor, including temperature, humidity, precipitation, wind speed, and/or dust sensors. The system 1500 includes the RFID tag with sensor 1501 (for example, RFID tag Gent with embedded temperature sensor and/or connected to the comb electrode dust sensor). The RFID tag is configured to receive a signal from an RFID reader 1503 (for example RFID reader with transmit power 500 mw). The system 1500 processes data obtained from RFID reader 1503 by way of middleware 1505, which is configured to store the data in database 1507 (for example, a relational database system). The database 1507 may be log file, a formatted file, such as XML or JSON, a table, a relational database system, an object-oriented database, or big data managed by a cloud service. The middleware 1505 may be configured to send the data to a server 1509 (for example an SMTP email server) that may send a notification message to a user, via Email, of hot spots, if they occur, as well as health related data obtained from the at least one sensor.

The system 1500 may provide a user friendly interface 1511 for a user to access information stored in the database 1507, which information was obtained from the RFID reader 1503. The database 1507 may store measurements, including temperature, humidity, dust, read from each RFID tag and may retrieve prior readings. The measurements may be stored with a date, time, and an Id of a device for which the measurements were made. In some embodiments, a section of the device may be indicated for each measurement, as well as locality information for physical location of the device, such as GPS coordinates, or a logical location, such as row and column in a grid of devices.

Figure 16:
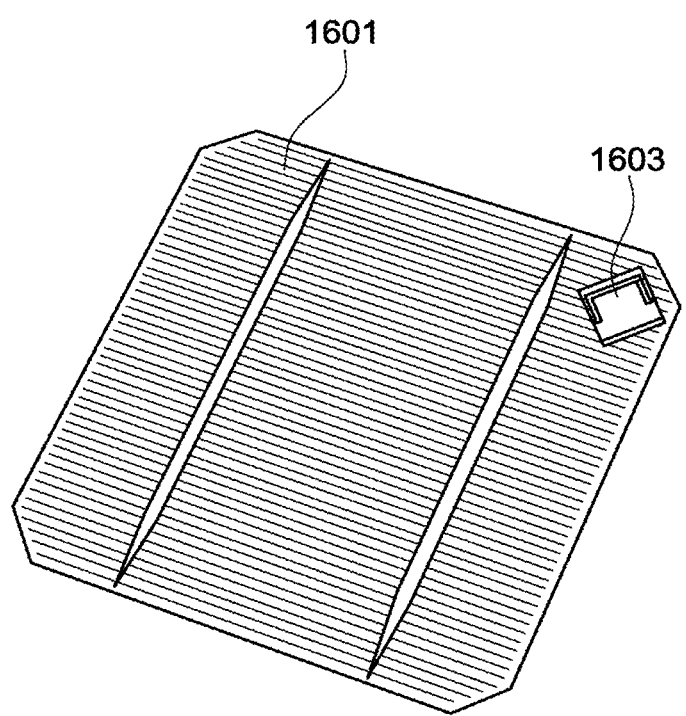
FIG. 16 illustrates an exemplary PV cell 1601 mounted with the RFID tag.

FIG. 16 illustrates an exemplary PV cell 1601 mounted with the RFID tag 1603 having an embedded temperature sensor. The PV cell 1601 may have electrical contacts and smaller electrical bars printed on a wafer. The RFID tag 1603 may be mounted to make an electrical connection with the electrical contacts and/or bars. In some embodiments, the RFID tag 1603 may be mounted on a PV cell 1601 without making an electrical connection.

Figure 17:
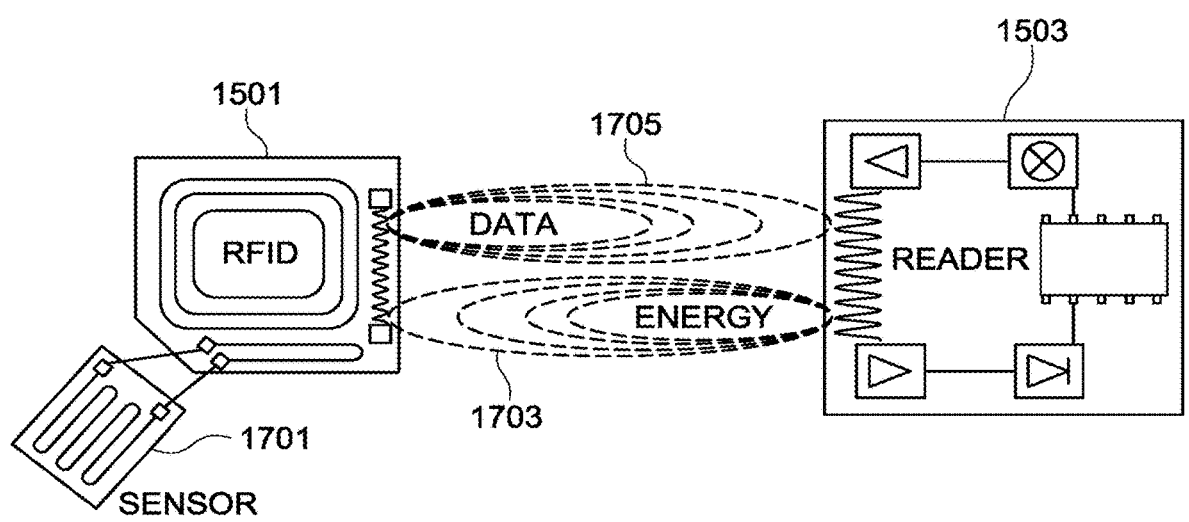
FIG. 17 illustrates operation of the RFID tag having an associated sensor 1701 in communication with a RFID reader in accordance with an exemplary aspect of the disclosure.

FIG. 17 illustrates operation of the RFID tag having an associated sensor 1701 based on communication with a RFID reader in accordance with an exemplary aspect of the disclosure. Components of the RFID tag include an integrated circuit and an antenna. The integrated circuit performs processing and stores data, obtains DC power from a reader signal, and may perform other specialized functions. The antenna transmits a signal. In operation, in order to retrieve information stored in the RFID tag 1501, the reader 1503 sends an electromagnetic excitation signal 1703 wirelessly to the RFID tag 1501. The radio-frequency electromagnetic excitation signal 1702 energizes the RFID tag 1501, and the RFID circuitry wirelessly transmits the stored information 1705 to the reader 1503. The reader 1503 receives and decodes the information 1705 received from the RFID tag 1501.

The RFID tag 1501 may be a passive RFID tag, which does not need a battery for activation. In the case of a passive RFID tag, the RFID tag 1501 obtains needed power when the RFID reader 1503 sends the radio-frequency electromagnetic excitation signal 1703 as an inquiry. The stored information retrieved from the RFID tag 1501 includes data for the purpose of automatic identification of the PV cell, which may be written-only information to identify the PV cell, date of manufacturing, date of installation, and other data for tracking the certain PV cell. The stored information further includes information detected by an associated sensor(s) and captured by the RFID tag 1501.

The RFID tag 1501 may also receive power directly from a PV cell, or indirectly from a storage cell (such as a battery pack) that stores energy from one or more PV cells. The RFID tag 1501 may include a power save mode in which when data is not being transmitted, a reduced amount of power required for wake-up communication is provided. An intermediate power mode may be one in which power needed to store sensor data is periodically provided on a measurement time schedule.

Figure 18:
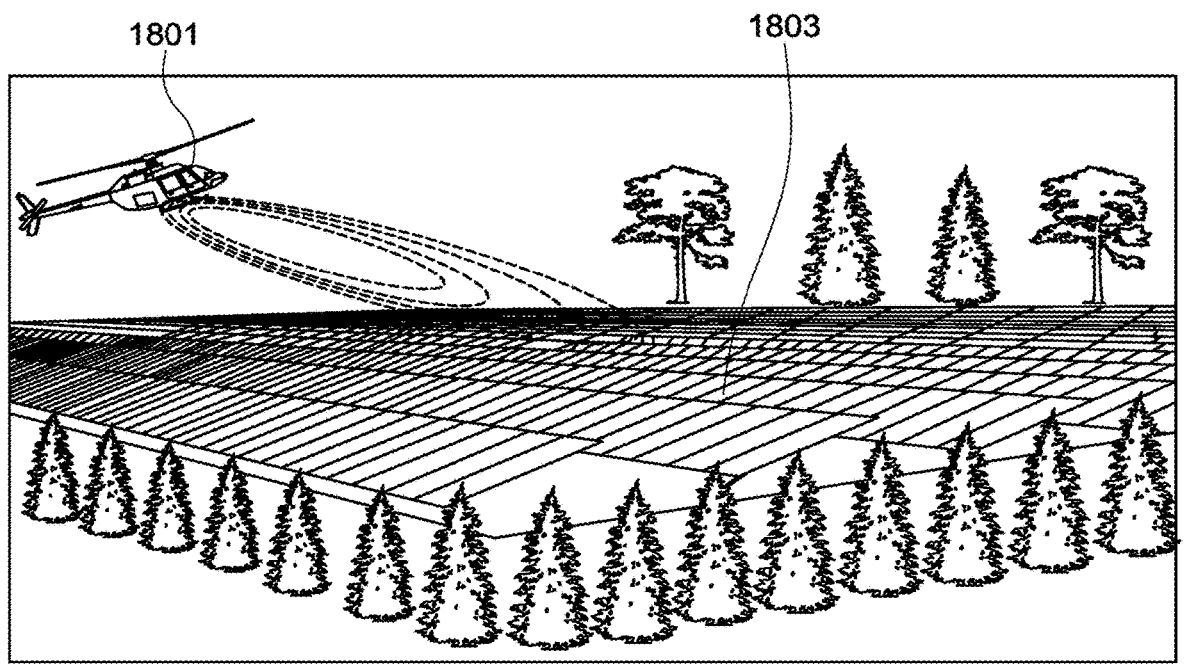
FIG. 18 illustrates a field of PV cells 1803 including RFID tags interrogated by an RFID reader.

The disclosed embodiments provide an efficient arrangement for a comprehensive diagnosis of PV cell fields, home or building mounted solar panels, or ground mounted solar panels serving the residential homes or buildings, in which solar panels typically include more than one PV cell. In some embodiments, a system 1500 may be configured to monitor a field or array of PV cells. FIG. 18 illustrates a field of PV cells 1803 including RFID tags interrogated by an RFID reader. The RFID reader may be attached to an airplane, helicopter, or drone 1801 that flies over the field or other arrangement of PV cells. In such case, the system 1500 may be configured to assign tasks to monitor all tags in range and may be configured to specify the start and end time of the task. The system 1000 may provide Email notifications in the case that a threshold, such as a temperature threshold, has been exceeded.

Although FIG. 18 shows a field arrangement, the system may include solar panels mounted on the roof of residential homes, ground mounted on property to supply power to the residential homes, on roofs and/or sides of commercial office buildings, or ground mounted in the vicinity of a commercial building. Roof top and/or wall mounting of solar panels may rely on the angle and direction of a roof, and not include a special mounting structure. Ground or flat roof arrangements of solar panels may include an angled platform structure on which one or more solar panels are mounted in order to expose the solar panels to optimal sunlight. Also, the angled platforms may be adjustable or motor operated to control angle and direction of the solar panels for obtaining optimal sunlight throughout each day. Fields of PV cells, arrays of PV cells and solar panels may provide power directly to a public utility power grid, home, or building, or may store power in a power storage cell (battery pack or the like).

Figure 19:
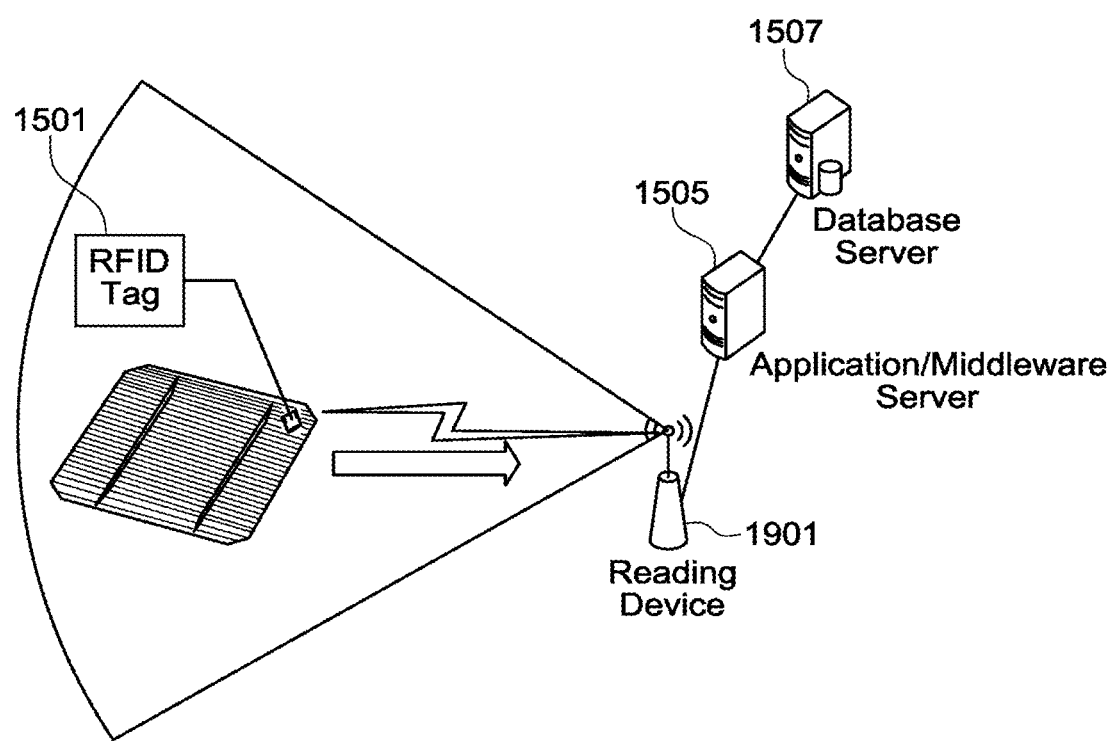
FIG. 19 illustrates a system with a RFID reader device fixed in a vicinity of the RFID tag.

FIG. 19 illustrates system 1500 with a RFID reader device 1901 fixed in a vicinity of the RFID tag 1501. When the RFID reader 1901 is located in communication range from the RFID tag 1501, the system 1500 can obtain sensor measurements in real-time.

Figure 20:
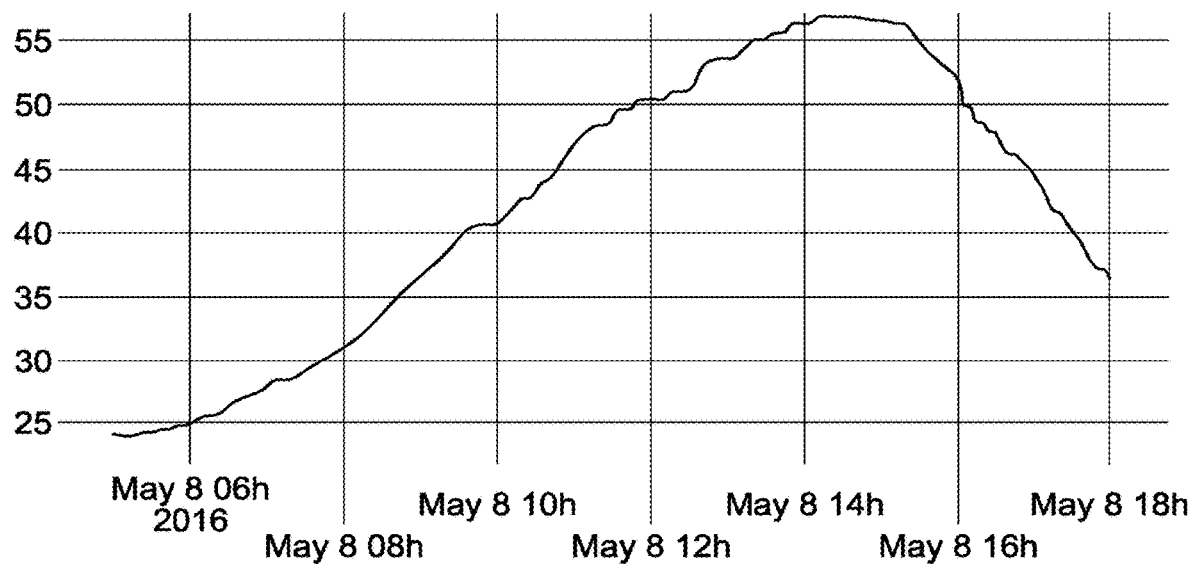
FIG. 20 is a graph showing an example in which temperatures are measured throughout a whole day.
Figure 21:
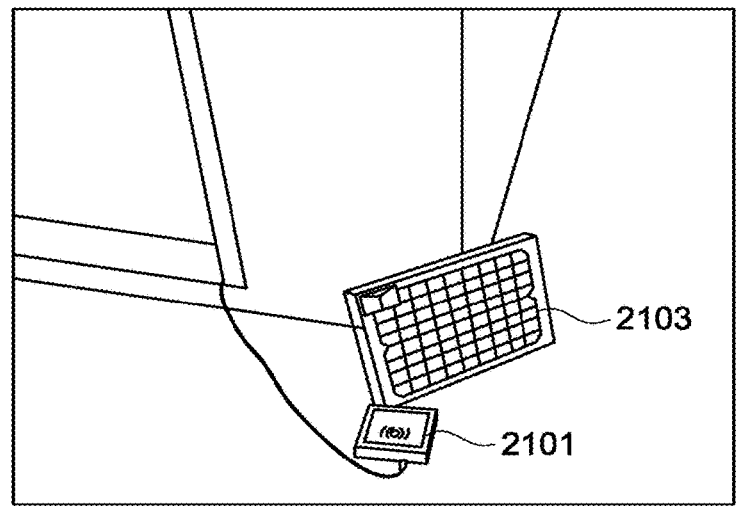
FIG. 21 shows an arrangement for measuring PV cell temperature including the RFID embedded sensor mounted to a PV cell.

As an example operation of the system, sensor measurements were taken hourly of the PV cell and the data was subsequently stored in a relational database 1507. FIG. 20 is a graph showing an example in which temperatures are measured throughout a whole day. FIG. 21 shows an arrangement for measuring PV cell temperature including the RFID embedded sensor 2101 mounted to a PV cell 2103. FIG. 22 shows an example display of data including measurements of hot spots. Each RFID tag is linked to a unique Tag ID 2203 and location. Measurement data includes a Reading ID 2201, Reading Date 2207, and Temperature 2205 for an RFID tag.

Obviously, numerous modifications and variations of the present invention are possible in light of the above teachings. It is therefore to be understood that within the scope of the appended claims, the invention may be practiced otherwise than as specifically described herein.

The invention claimed is:

1. A photovoltaic (PV) cell health monitoring apparatus, the apparatus comprising:
    an Radio Frequency Identification (RFID) tag mounted to the PV cell and having identifying information of the PV cell; and
    a sensor in communication with the RFID tag for measuring health information of the PV cell,
    wherein the RFID tag stores the measured health information together with time and locality information of the PV cell and responds to an interrogation signal by transmitting the stored information together with the identifying information,
    wherein the sensor is a film present on the surface of the PV cell, wherein the film comprises a plurality of electrodes having a thickness of 2-50 µm, and wherein the plurality of electrodes are interleaved comb anodes and comb cathodes.

2. The PV cell health monitoring apparatus of claim 1, wherein the sensor is a dust sensor for measuring an amount of dust on an exposed surface of the PV cell,
the dust sensor sending dust measurement information to the RFID tag.

3. The PV cell health monitoring apparatus of claim 2, wherein the dust sensor measures electrical conductivity of the exposed surface of the PV cell.

4. The PV cell health monitoring apparatus of claim 2, wherein dimensions of the dust sensor are substantially the area of the exposed surface of the PV cell.

5. The PV cell health monitoring apparatus of claim 1, wherein the film is a conductive ink printed on the exposed surface of the PV cell.

6. The PV cell health monitoring apparatus of claim 1, wherein the film is a transparent conductive material.

7. The PV cell health monitoring apparatus of claim 6, wherein the transparent conductive material is one or more materials from the group consisting of indium tin oxide, fluorine doped tin oxide, doped zinc oxide.

8. The PV cell health monitoring apparatus of claim 1, wherein the sensor is a temperature sensor for measuring temperature, wherein the RFID tag uses the temperature measurements to detect hot spots of the PV cell.

9. The PV cell health monitoring apparatus of claim 8, wherein the temperature sensor is an antenna in the RFID tag.

10. The PV cell health monitoring apparatus of claim 9, wherein the antenna temperature sensor is a meander-line antenna having a plurality of unequal turns.

11. The PV cell health monitoring apparatus of claim 10, wherein the antenna temperature sensor includes a layer of polyethylene on a radiating surface of the antenna.

12. The PV cell health monitoring apparatus of claim 10, wherein the antenna temperature sensor includes a layer of distilled water on a radiating surface of the antenna.

13. The PV cell health monitoring apparatus of claim 1, wherein the RFID tag is a passive RFID tag mounted to the PV cell.

* * * * *